May 1, 1951     L. D. COBB     2,550,911
ANTIFRICTION BEARING
Filed Aug. 30, 1945
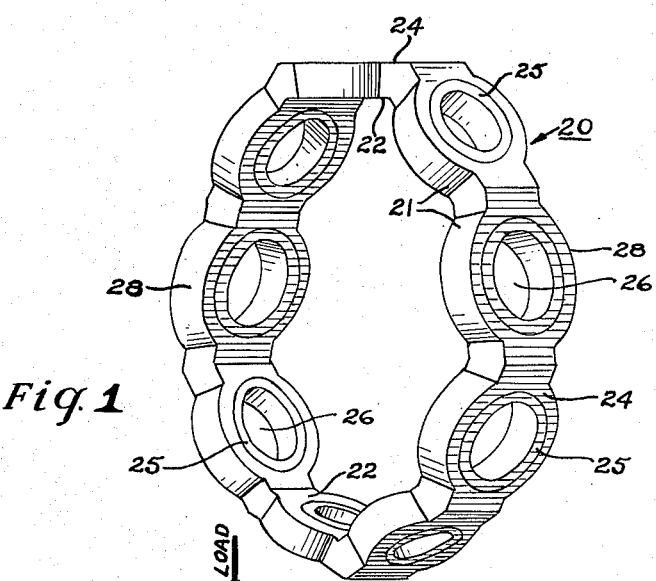
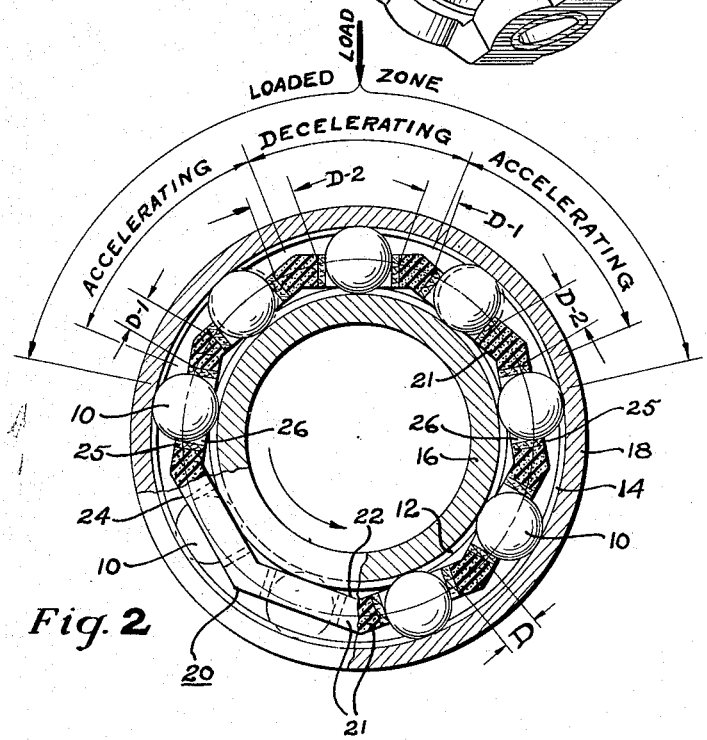
INVENTOR;
LELAND D. COBB.
BY Romeyn A. Spare
HIS ATTORNEY.

Patented May 1, 1951

2,550,911

UNITED STATES PATENT OFFICE 2,550,911

ANTIFRICTION BEARING

Leland D. Cobb, Forestville, Conn., assignor to General Motors Corporation, Detroit, Mich., a corporation of Delaware Application August 30, 1945, Serial No. 613,513

6 Claims. (Cl. 308—201)

This invention relates to separators or retainers for the rolling elements of antifriction bearings and comprises all of the features of novelty herein disclosed.

An object of my invention is to provide an improved separator or retainer for the rolling elements of antifriction bearings and which will allow non-uniform movements of the rolling elements.

Another object is to provide a separator which will yield through portions of its periphery to accommodate individual changes of movements of the rolling elements in an antifriction bearing.

To these ends and also to improve generally upon devices of this character, the invention consists in the various matters hereinafter described and claimed. In its broader aspects, the invention is not necessarily limited to the specific structure selected for illustrative purposes in the accompanying drawings in which Figure 1 is a perspective view of my separator; and Figure 2 is a side elevation partly in section and showing an antifriction bearing equipped with my separator.

In antifriction bearings that non-uniformly support loads and wherein separator-guided rolling elements roll in engagement with opposed raceways, the rolling elements tend to individually change their rates of movements while passing through the loaded zone of the bearing. Prior to this invention, separators were constructed to maintain the rolling elements uniformly spaced so that the rolling elements were constrained to travel between the raceways at the same uniform rate of speed while relative race ring rotation remained constant, thereby causing objectionable friction, heating and wear which resulted from a slight sliding of these rolling elements on the raceways and from a binding of these rolling elements against the separator while moving through the loaded zone of the bearing. This previous separator-restricted rolling element movement has been one of the principal causes for failure of antifriction bearings.

The change in rate of rolling element movement through a loaded zone of a bearing is illustrated in somewhat exaggerated form in Figure 2 wherein rolling elements 10, herein illustrated as balls, roll upon raceways 12 and 14 formed in race rings 16 and 18, these rolling elements being yieldably-guided by my improved separator 20. The usual non-uniform loading of an antifriction bearing produces a loaded zone, as indicated, and the load-carrying portions of one or both race rings are slightly distorted causing the rolling elements 10 to accelerate in the first and last portions of the loaded zone and to decelerate while rolling through the intermediate portion of the more heavily loaded zone. Under conditions of race ring misalignment, this non-uniformity of rolling element movement is greatly increased. For purpose of comparison, the dotted rolling element positions within the loaded zone show the uniformly spaced positions which the rolling elements must assume when guided by one of the prior types of separators which do not have the resilient characteristics of my invention.

My separator 20, which is generally annular in shape, is herein illustrated in the form of a multi-sided regular polygon composed of a continuous body of inherently resilient material having similar angularly disposed sides 21 each of which is provided with a pair of flat inner and outer faces 22 and 24. Extending through each of these sides 21 is a rolling element guiding member herein shown as a substantially non-resilient tubular member 25 having ends lying substantially within the planes of the faces 22 and 24. These tubular members, which may be composed of a phenolic condensation product as "Synthane" or of other suitable material that has antifriction and wear resistant characteristics in the presence of lubricant, are integrally bonded as by vulcanizing or by other suitable means to the resilient sides 21 which surround their peripheries. Each tubular member 25 has a through aperture 26 extending generally radially of the separator and freely receiving a rolling element 10.

In the illustrated embodiment, to aid the yieldability of my separator, the resilient adjoining sides 21 between adjacent tubular members 25 are of lesser width than the diameter of these tubular members, and each side 21 has an enlarged portion 28 which embraces one of the tubular members. However, if desired, the body portion of my separator may comprise a ring shaped member of uniform width and having substantially radially disposed through apertures in which the tubular members 25 are secured. My illustrated separator rotates with a minimum amount of friction since I make it of such an internal size that the sides 22 may lightly and tangentially engage the periphery of the inner race ring 16 along spaced elements at each side of the raceway 12, and preferably along diametrical lines across the inner ends of the tubular members 25. Also, the multi-sided separator construction aids the circulation of lubricant throughout the bearing and provides a cooler operating bearing.

As illustrated in Figure 2, D indicates the length of the resilient body portion of my separator between adjacent tubular members 25 and along the pitch line of the rolling elements 10 when these rolling elements are outside of the loaded zone of the bearing. When a rolling element within the loaded zone is accelerating towards the preceding rolling element and away from the succeeding rolling element, the body portions between adjacent tubular members are resiliently compressed at D—1 and resiliently stretched at D—2 so that the rolling elements 10 may individually change their rates of true rolling movement through the loaded zone and be free from the previous detrimental separator-urged sliding movement. During this irregular rolling element movement each tubular member 25 will freely accelerate or retard with its rolling element and will not deform into binding contact with its rolling element. After a rolling element leaves the loaded zone, the separator portions between the tubular members again resiliently return to their unstressed form.

I claim:

1. An antifriction bearing separator comprising a polygonal shaped inherently resilient member having a series of angularly disposed interconnected flat sides, each of said sides having a rolling element-receiving aperture therethrough, and the interconnected portions of the sides between each pair of adjacent apertures being resiliently deformable under control of the rolling elements in said apertures to accommodate non-uniform movements of a rolling element through the loaded zone of an antifriction bearing.

2. In an antifriction bearing having a plurality of rolling elements movable between a pair of race rings, a polygonal-shaped separator between said race rings, a series of angularly disposed interconnected flat sides on said separator, each of said sides being tangentially engageable with one of the race rings to centrally position the separator, and each of said sides having a through aperture for receiving one of the rolling elements.

3. In an antifriction bearing separator, a plurality of annularly disposed spaced tubular members, each of said members having a through aperture for receiving a rolling element, and inherently resilient wall portions secured to and yieldably holding said tubular members in spaced relation.

4. An antifriction bearing separator comprising a substantially annular member having peripherally spaced enlarged portions, a non-resilient tubular member integrally secured to and extending through each enlarged portion, and inherently resiliently deformable portions of said member connecting each pair of adjacent enlarged portions.

5. In an antifriction bearing having rolling elements movable into and out of a loaded zone, a separator provided with a substantially annular body portion of inherently resilient material and having peripherally spaced apertures for receiving the rolling elements, and the resilient material between said apertures permitting each rolling element to change its movement peripherally of the separator when said rolling element is within the loaded zone.

6. In an antifriction bearing having rolling elements movable through a loaded zone, a separator provided with a substantially annular body portion having peripherally spaced apertures, means secured to the body portion and having apertures for receiving the rolling elements, and said entire body portion being composed of inherently resilient material to yieldably permit the rolling elements to individually change their rates of rolling movement while passing through said loaded zone.

LELAND D. COBB.

REFERENCES CITED

The following references are of record in the file of this patent:

UNITED STATES PATENTS

| Number | Name | Date |
|---|---|---|
| 824,819 | Riebe | July 3, 1906 |
| 215,019 | Model | Apr. 23, 1907 |
| 851,697 | Schneider | Apr. 30, 1907 |
| 951,847 | Seubert | Mar. 15, 1910 |
| 993,471 | Swift | May 30, 1911 |
| 1,172,738 | Rockwell | Feb. 22, 1916 |
| 1,856,823 | Robinson | May 10, 1932 |
| 1,996,841 | Stevens | Apr. 9, 1935 |
| 2,391,245 | Kail | Dec. 18, 1945 |

FOREIGN PATENTS

| Number | Country | Date |
|---|---|---|
| 182,562 | Germany | Apr. 15, 1907 |
| 41,310 | Switzerland | Sept. 10, 1907 |
| 212,007 | Germany | July 20, 1909 |
| 609,445 | France | Aug. 14, 1926 |